Figure 1:
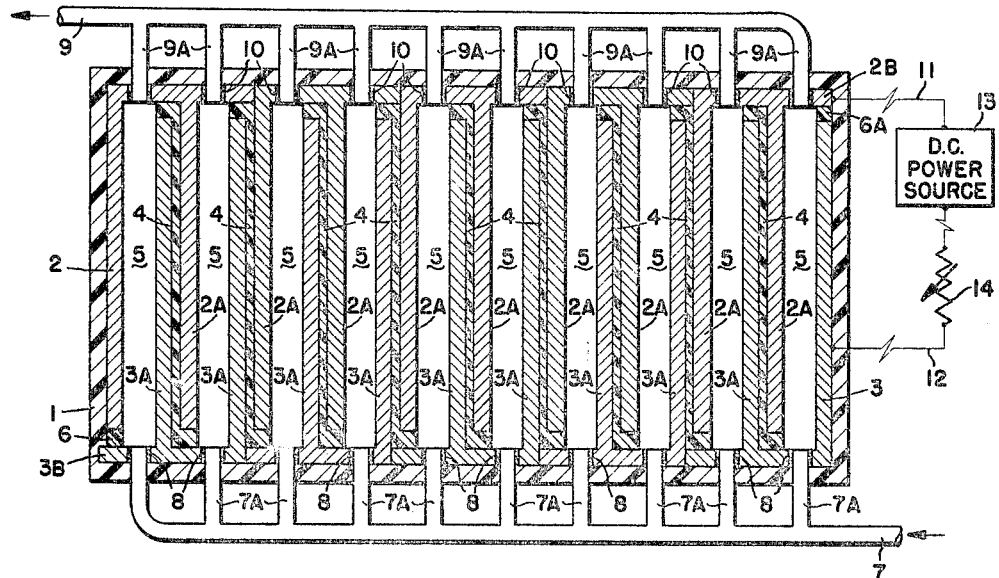

Aug. 30, 1966

C. H. WORSHAM ET AL 3,269,932

MULTI-CELL REACTOR IN PARALLEL

Filed Sept. 1, 1961

2 Sheets-Sheet 1

Charles H. Worsham
John V. Clarke, Jr.   INVENTORS

BY Olin B. Johnson

PATENT ATTORNEY

Aug. 30, 1966 C. H. WORSHAM ET AL 3,269,932
MULTI-CELL REACTOR IN PARALLEL
Filed Sept. 1, 1961 2 Sheets-Sheet 2

Charles H. Worsham
John V. Clarke, Jr. INVENTORS

BY Alin B. Johnson

PATENT ATTORNEY

United States Patent Office 3,269,932
Patented August 30, 1966

3,269,932
MULTI-CELL REACTOR IN PARALLEL
Charles H. Worsham, Fanwood, and John V. Clarke, Jr., Cranford, N.J., assignors to Esso Research and Engineering Company, a corporation of Delaware
Filed Sept. 1, 1961, Ser. No. 135,672
5 Claims. (Cl. 204—270)

The present invention relates to means for improving the assembly and operation of a plurality of electrochemical cells in combinations hereinafter referred to as "cell packs" or "multi-cell electrochemical reactors." In particular, this invention relates to the design and assembly of apparatus comprising in combination a plurality of electrochemical cells adapted for continuous partial oxidadation processes.

One embodiment of this invention utilizes a novel electrode unit adapted for assemblage in multiples to provide multi-cell reactors of any desired size.

Electrochemical oxidation of organic compounds in both fuel cells and electrolytic cells is known in the art.

The term "fuel cell" is used herein and in the art to denote a device or apparatus wherein hydrogen or an organic compound of lower oxidation state than carbon dioxide is oxidized electrochemically with resulting production of electrical energy. The over-all fuel cell reaction is the sum of two essentially independent half-cell reactions. At the anode, a combustible fuel such as hydrogen, carbon monoxide, or a carbon and hydrogen comprising compound is oxidized with a release of electrons to such electrode. At the cathode, oxygen continuously admitted from an outside source accepts electrons and is reduced. Water is formed as a product of the ions formed at the respective electrodes and this with the oxidation products of an organic feed stock, when such is employed, constitute the chemical or non-electrical products of the reaction. The electrical circuit is completed by ion transfer between electrodes through the electrolyte and electron transfer between electrodes by conductors positioned outside such electrolyte. Catalysts which may be the same or different are associated with the surfaces of the opposing electrodes which are exposed to the electrolyte. The fuel cell may be employed to produce valuable chemicals simultaneously with such power production where the feedstock comprises a hydrogen-containing organic compound of at least two oxidation states lower than carbon monoxide and such oxidation is terminated before conversion to the simple oxides of carbon. Thus, alcohols, ketones and carboxylic acids may be selectively produced electrochemically from suitable organic feedstocks of lower oxidation state by removing such products from the cell at their respective oxidation states.

The term "electrolytic cell" is used herein and in the art to denote an externally powered electrochemical cell wherein anodic oxidation of an organic compound is effected in a manner similar to the aforedescriebd fuel cell process but without a net production of electrical energy. In this type of cell a direct electric current from an external power source, e.g. an alternating current rectifier, fuel cell pack, etc., is admitted to the cathode in lieu of the oxidizing gas employed at the fuel cell cathode. Since water is dissociated in the operation of such cell, it must be replenished as the reaction proceeds.

The processes to which the apparatus of this invention is directed are more efficiently carried out by employing large groups of relatively small cells in combination in a single compact unit or multi-cell reactor. In large installations these units may themselves be combined in series and/or parallel as best suits the individual requirements of the installation and the processes to be carried out. To avoid prohibitive losses of voltage from internal resistance the distance between electrodes must be limited, e.g. about ¼ inch or less. The size of the electrodes employed also becomes important since construction problems increase with increases in the superficial surface area of the electrode, especially when relatively brittle materials, such as porous carbon, are used. When structural strength is achived by increasing the thickness of porous electrodes, losses due to internal resistance increase. When carbon dioxide is a product of the anodic oxidation, either by accident or design, the escape of this gas from the electrolyte compartment with its attendant problems of electrolyte level control can be more easily controlled in smaller cells.

It is, therefore, an object of the instant invention to provide apparatus whereby a large number of electrochemical cells may be used in parallel in a compact, simplified cell pack.

It is a further object to provide means for facilitating and simplifying the construction of a multi-cell electrochemical reactor adapted for continuous production and recovery of a partial oxidation product of an organic feedstock, e.g. a process wherein such feedstock is an organic compound comprising carbon and hydrogen and said product is also an organic compound comprising carbon and hydrogen but one which contains at least one more oxygen atom per molecule than such feedstock.

Other objects of the instant invention will appear in a more detailed description of the instant invention given below.

Accordingly, reference is made to the accompanying drawings forming a part of this specification.

FIGURE 1 is a side view in cross-section of one embodiment of the invention showing an externally powered multi-cell reactor comprising a plurality of electrolytic cells in parallel electrical connection.

Figure 2:
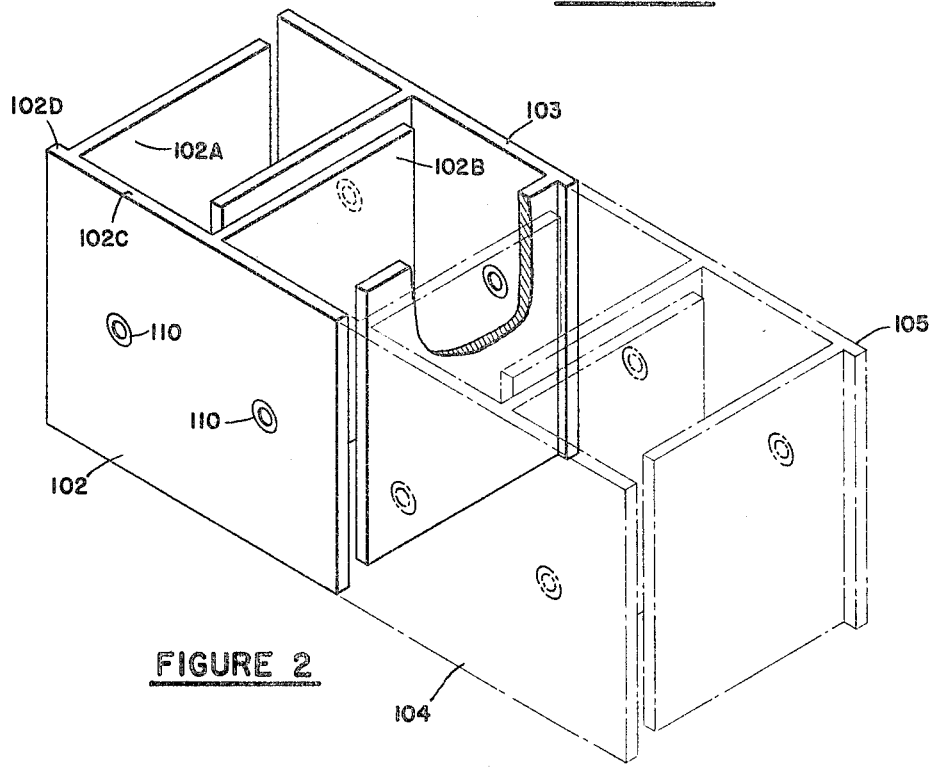
Figure 3:
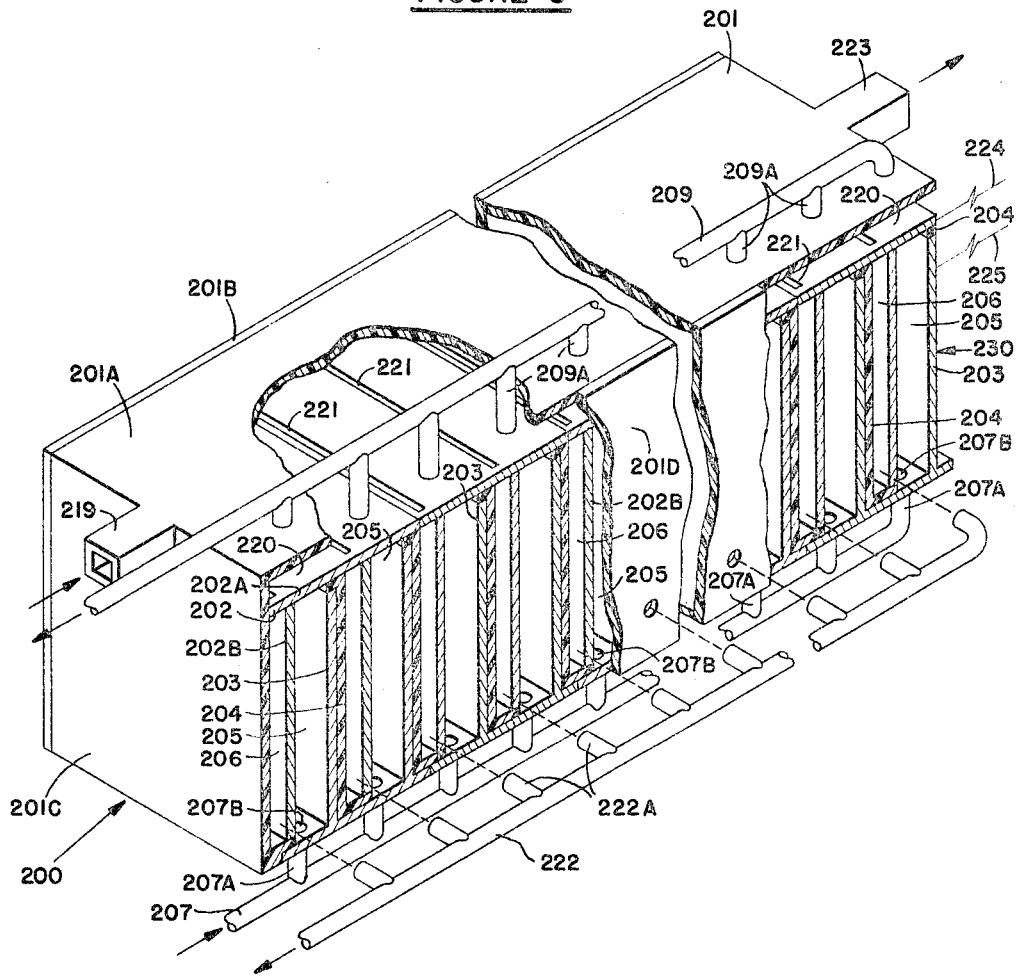

FIGURE 2 shows in solid outline an isometric view of two identical electrode units each in the shape of a flanged-F member, the two units in solid outline being positioned to demonstrate their adaptability to complementary assembly so as to form the conductive elements of a multi-cell reactor of the types shown in FIGURES 1 and 3. Additional units shown in broken line demonstrate the adaptability of such units to multiple assembly in side-by-side relationship.

FIGURE 3 is a perspective view of another embodiment of the invention showing an enclosed cell pack or multi-cell reactor comprising a plurality of fuel cells in parallel electrical connection with a portion cut away to show the fuel cell elements composing it.

Referring first to FIGURE 1, there is shown a water-tight cell pack housing or reaction vessel 1 of a nonconductive material such as a suitable plastic or hard rubber. Inside vessel 1 there are positioned two identically shaped conductive elements 2 and 3. As here shown, the uppermost of these elements 2 may be designated the anode element and is made up of anode plates 2A extending in perpendicular relationship to the major or horizontal arm of an L-shaped anode trunk conductor 2B. Trunk 2B here forms the top side of each of the cells in the pack while anode plates 2A with the corresponding insulator 4 form one side wall of each of the interior cells and the inner side wall of the right terminal cell. The opposing element 3 may be designated the cathode element and correspondingly is made up of a plurality of cathode plates 3A and a cathode trunk conductor 3B. Trunk 3B here forms the bottom side of each of the cells in the pack while cathode plates 3A with the corresponding insulator 4 form one side wall of each of the interior cells, i.e. opposite the corresponding anode 2A, and the inner side wall of the left terminal cell. In this embodiment one arm of trunk conductors 2B and 3B extends downward and upward, respectively, to form with insulators 6 and 6A the outer side wall of the terminal cells. Conductive elements 2 and 3 may be formed as a single piece of metal or the electrodes 2A and 3A may be prepared as separate elements and subsequently brought into electrical communication with the corresponding trunk member so as to be rigidly associated therewith. The connecting means employed for this association may be adapted to leave such electrodes detachable for separate cleaning or resurfacing. In the embodiment, here shown, trunk elements 2 and 3 are assembled from a plurality of smaller units. Such units are discussed in greater detail in the description of FIGURE 2.

Thus, anodes 2A, cathodes 3A, trunk conductors 2B and 3B form with insulators 4 a plurality of essentially rectangular chambers and these together with nonconductive side wall members, not shown, form a plurality of reaction chambers 5 of essentially equal size and configuration. In operation an aqueous electrolyte and the compound to be converted are admitted to chambers 5. Ion transfer through this electrolyte and between opposing electrodes, e.g. 2A and 3A, provides the internal portion of the electrical circuit. Ingress or egress from reaction chambers 5 is provided at or near the bottom of each cell or chamber by conduit means 7A which communicates with trunk conduit 7. At or near the top of each chamber similar conduit means 9A communicate with the chamber and with trunk conduit 9 so as to admit of liquid or vaporous flow to or from the cells. Thus, the design admits of reversing the direction of fuel and product recovery streams as desired. Additional conduits, not shown, may be utilized to remove hydrogen evolved in the process where it is not practical to remove same with other vaporous product, e.g. when top fueling is employed and liquid product is recovered as bottoms. Conduits 7A are insulated from cathode trunk 3B by insulators 8. Conduits 9A are insulated from anode trunk 2B by insulators 10. Anode trunk 2B and cathode trunk 3B are shown connected by wires 11 and 12 to a source of direct electric current or its equivalent 13, e.g. storage batteries, fuel cell pack, or an alternating current rectifier. Variable resistance means 14 is shown in this external circuit to provide a control means for potential and/or reaction rates for the partial oxidation process to be carried out in this reactor. Insulating means 4, 6, 6A, 8 and 10 may be of any suitable nonconductive material that is watertight, essentially inert to the electrolyte employed and which remains physically and chemically stable under the conditions under which the cells are to be operated. Electrode plates 2A and 3A may be surfaced with a catalytic material, e.g. by electroplating. Catalysts to be employed do not comprise part of this invention and any of the conventional electrochemical catalysts, such as noble metals, may be employed on electrodes of this reactor so as to meet the catalytic requirements of the process to be carried on therein.

Referring now to FIGURE 2, there is shown one embodiment of a novel building unit for use in the assembly of multi-cell electrochemical reactors of desired size and capacity. Thus, in FIGURE 2, there is shown in solid outline, two identically shaped conductor elements 102 and 103 positioned to demonstrate their adaptability for complementary pairing. The conductor 102 shown in FIGURE 2 is in the shape of a flanged-F and comprises two parallel electrode members 102A and 102B and a trunk conductor 102C. Electrode 102A is positioned in perpendicular relationship with trunk 102C and united therewith a short distance from one end of 102C. That portion of trunk 102C extending from electrode 102A to the nearest end of 102C constitutes a connecting flange 102D for use in side-by-side assembly of these units. When complementary pairs of such units are assembled in side-by-side relationship, flange 102D provides spacing means for interposition of insulators and/or air channels between one electrode and the nearest electrode of opposite polarity. Flange 102D should be of a length sufficient to provide only the amount of spacing required for such insulation or the interposition of air channels for fuel cell embodiments. Electrode 102B is positioned parallel to electrode 102A and unites with trunk conductor 102C between electrode 102A and the end of trunk 102C most distant from electrode 102A. The positioning of electrode 102B with reference to 102A and 102C can be varied somewhat to allow spacing for insulation between 102B and nearest electrode of opposite polarity which will extend in parallel relationship with 102B from conductor 103. However, electrode 102B will not be positioned closer to 102A than one-half the distance between 102A and the most distant end of 102C and ordinarily will be positioned somewhat farther from 102A. Positioned in trunk 102C on either side of its junction with electrode 102B are openings 110 to allow communication with conduit means to provide means for ingress or egress when such elements are brought together to form a reactor. Conductive element 103 is of identical shape to element 102. A portion of one electrode member is shown cut away to more fully show how elements 102 and 103 complement each other in cell assembly.

The flange 102D may be omitted when components are to be employed in the assemblage of reactors, the design of which will permit such omission in which case the building unit or conductive element is merely F-shaped as, for instance, the elements employed as electrodes and trunk conductors in FIGURE 1.

In FIGURE 2, there is also shown in broken outline a second complementary pair of conductive elements 104 and 105 to demonstrate the positioning of such pairs in side-by-side relationship.

Referring now to FIGURE 3, there is shown a fuel cell pack 200 comprising a watertight housing 201 of a suitable nonconductive material and a multi-cell reaction unit 230. In order to show the reactor elements more fully the pack is shown with the bottom wall, one end wall and a part of one side wall removed. The remainder of the housing is made up of top wall 201A, side walls 201B and 201D and end wall 201C. The top of reaction unit 230 forms with housing 201 a manifold 220 for supplying air to the cells of the reaction unit. Manifold 220 and its role in the operation of the reactor is hereinafter discussed in greater detail. Reaction unit 230 is made up of opposing conductive elements 202 and 203. Elements 202 and 203 have essentially the same configuration as the elements shown in greater detail in FIGURE 2. Elements 202 and 203 are assembled vertically in complementary pairs and insulated from each other as shown by insulators 204 and a projection of end wall 201C. Elements 202 are made up of a metal trunk member 202A and porous electrode members 202B, e.g. porous carbon plates held in contact with 202A by a peripheral metal band or retaining member. Elements 202 abut with each other in a horizontal relationship establishing electrical communication between all such units thereby forming a continuous cathodic element. Elements 203 are similarly arranged in horizontal relationship and together form, when thus assembled, a continuous anodic element. Conductive elements 202, 203, and insulators 204 form with the outer housing 201 electrolyte or reaction chambers 205. Elements 202 and insulators 204 form with outer housing 201 oxidant or air receiving chambers 206 for all cells except the left terminal cell here where compartment 206 is formed solely by the leftmost of the elements 202 and housing 201. Air feed conduits 219 and 223 connect manifold 220 with the atmosphere or an air pumping means, not shown. In operation of the reactor air enters manifold 220 via conduit 219 and passes through slots or passageways 221 in cathode trunk member 202A. Slots 221 communicate with air receiving chambers 206. Excess air entering manifold 220 may leave the system via conduit 223 or, in the alternative, air may be admitted to manifold 221 through both 219 and 223 where the length of the reactor is such that a single air feed is insufficient. In operation air entering chambers 206 enters the pores of porous electrodes 202B and therein contacts electrolyte from electrolyte chambers 205 which enters such pores from the opposite side of electrodes 202B. Excess air and oxygen depleted air exits from air chambers 206 via conduits 222A which communicate with air trunk conduit 222 which exhausts to the atmosphere. Electrolyte chambers 205 have an opening 207B in the lower wall thereof and through this communicate with a lower conduit system formed by pipes or tubes 207A and 207. Chambers 205 also communicate with an upper conduit system formed by pipes or tubes 209 and 209A. In the operation of the reactor one of these conduit systems will provide fueling means for admitting the oxidizable fuel to the electrolyte or a fuel and electrolyte mixture to the chambers 205. Cells of this design require that the fuel to be oxidized be soluble in the electrolyte either per se or with the employment of an intermediary or cosolvent. When the conduit system represented by pipes 209 and 209A are employed for fueling, product recovery will be made by removal of a partial oxidation product and electrolyte via pipes 207 and 207A. Electrolyte may then be separated from the product stream and recycled to the reactor either through the fueling stream or by other conduits, not shown. In the alternative the reactor is adapted for fueling through pipes 207 and 207A with product recovery through pipes 209 and 209A. This method of fueling is employed when the organic product to be recovered from chambers 205 is recovered as a vapor or gas. Wire leads 224 and 225 represent leads to an external circuit, not further shown here, whereby electrical communication between the anodic and cathodic elements of the reactor is established and from which electrical energy generated by the electrochemical reactions occurring within the reactor can be withdrawn for use as power.

The active components of fuel cells are well known and need not be described in detail. Suitable catalysts, electrolytes, oxidants and fuels are well known. This invention provides novel apparatus for more efficient utilization of the fuel cell principle and a more effective use of the electrolytic reactor. It is not limited to the use of any particular catalyst, electrolyte, etc. As aforementioned, the over-all fuel cell reaction is the sum of two essentially independent half-cell reactions. Hence, any suitable catalytic material may be employed upon the electrode surfaces which will promote the intended half-cell reaction at such electrode. Naturally, the acidity or basicity of the electrolyte to be used will be considered in choosing the catalysts as well as the components and materials of construction.

It will be understood also that the term "fuel electrode" when employed herein is equivalent to "anode" and that "oxygen electrode" is equivalent to "cathode."

The term "porous electrode" as employed herein refers to a foraminous structure admitting of the passage of a gas or liquid therethrough at atmospheric pressure.

Other modifications consistent with the spirit of the invention will suggest themselves to those skilled in the art and it is intended to cover them, so far as the prior art permits by the following claims.

What is claimed is:

1. A multi-cell electrochemical reactor comprising an anodic element, a cathodic element, insulation and enclosure means associated with said elements so as to sealingly form therewith adjacent, watertight, reaction chambers, a plurality of conduit means communicating with said chambers and conduction means external to said reaction chambers establishing electrical connection between said anodic element and said cathodic element, wherein said anodic element and said cathodic element each comprise an L-shaped trunk plate with a plurality of electrode plates rigidly associated therewith and extending parallel to one leaf thereof, and wherein said anodic element and said cathodic element are positioned so that said trunk plates are connected by insulative means so that said electrode plates interfit in staggered and parallel relationship and each such electrode is connected by insulative sealing means to the nearest electrode of opposite polarity so as to form a plurality of rectangular channels in parallel electrical connection, said channels in cooperation with said enclosure means forming said reaction chambers.

2. A multi-cell electrochemical reactor in accordance with claim 1 wherein said cathodic element comprises a metal trunk plate and a plurality of porous cathode plates, wherein said cathode plates are positioned in relation to said insulative sealing means so as to divide said reaction chambers into an oxidant receiving compartment and an electroylte compartment which communicate with each other through said porous cathode plates, and wherein there is associated with said oxidant receiving compartment inlet and outlet means admitting of the passage of a fluid oxidant therethrough.

3. Apparatus comprising in combination a frame-like anodic element which comprises a plate-like anode trunk and a plurality of anode plates extending at right angles from and in electrical connection with said anode trunk, said anode plates forming with said anode trunk a plurality of essentially equal and parallel channels; a frame-like cathodic element which comprises a plate-like cathode trunk and a plurality of cathode plates extending at right angles from and in electrical connection with said cathode trunk, said cathode plates forming with said cathode trunk a plurality of essentially equal and parallel channels, said anodic element positioned in relation to said cathodic element so that said anode trunk and said cathode trunk are in parallel relationship, with said anode plates and said cathode plates extending into the aforesaid channels formed by the aforementioned elements of opposite polarity thereby aligning said anode plates and said cathode plates in parallel and staggered relationship while maintaining said anodic element and said cathodic element in insulated relationship with each electrode of such elements separated from the nearest electrode of opposite polarity by a watertight, insulative sealing material thereby forming a plurality of rectangular channels having two open ends; nonconductive wall members insulatingly sealed to said anodic element, said cathodic element and said sealing material so as to form with said rectangular channels a plurality of adjacent electrochemical box-like cells in parallel electrical connection; a plurality of conduits communicating with the interior of said cells; and conduction means external to said cells establishing electrical connection between said anodic element and said cathodic element.

4. Apparatus in accordance with claim 3 wherein said anodic element and said cathodic element each comprise an assembly of abutting integrally formed F-shaped conductors.

5. In a multi-cell electrochemical reactor comprising an anodic element, a cathodic element, insulation and enclosure means associated with said elements so as to sealingly form therewith adjacent, watertight reaction chambers, a plurality of conduit means communicating with said chambers and conductive means external to said reaction chambers establishing electrical connection between said anodic element and said cathodic element, the combination of two electrochemical cells comprising in combination an essentially F-shaped anodic element and an essentially F-shaped cathodic element positioned so as to interfit with said anodic element in complementary paired relationship and insulating means separating said elements and forming therewith rectangular channels in side-by-side relationship and in parallel electrical connection, said channels in cooperation with said enclosure means forming two of said reaction chambers.

(References on following page)

References Cited by the Examiner

UNITED STATES PATENTS

| | | | |
|---|---|---|---|
| 592,735 | 10/1897 | Jones | 204—275 |
| 1,996,799 | 4/1935 | Evans | 204—275 |
| 2,925,454 | 2/1960 | Justi et al. | 136—86 |
| 2,925,455 | 2/1960 | Eidensohn | 136—86 |

FOREIGN PATENTS 24,174  11/1904  Great Britain.

JOHN H. MACK, *Primary Examiner.*

D. R. JORDAN, *Assistant Examiner.*